Feb. 13, 1962   U. HÜTTER ET AL   3,021,246
PROCESS FOR PRODUCING A STRUCTURE OF FIBER
REINFORCED PLASTIC MATERIAL
Filed April 24, 1958   3 Sheets-Sheet 1

INVENTORS
Ulrich Hütter
Eugen Hänle

Bailey, Stephens & Huettig
Attorneys

Inventors
Ulrich Hütter
Eugen Hänle

Bailey, Stephens & Huettig
Attorneys

United States Patent Office 3,021,246
Patented Feb. 13, 1962

3,021,246
PROCESS FOR PRODUCING A STRUCTURE OF FIBER REINFORCED PLASTIC MATERIAL
Ulrich Hütter, 93 Schlierbacher Strasse, Kirchheim (Teck), Germany, and Eugen Hänle, Schlattstall, Kreis Nurtingen, Germany
Filed Apr. 24, 1958, Ser. No. 730,565
Claims priority, application Germany May 17, 1957
11 Claims. (Cl. 156—196)

The invention is concerned with a process for making shell forms or plates of artificial material reinforced with fibres such as aero- and hydro-dynamic supporting or driving blades, fuselages, body-work or the like.

It is known to reinforce supporting shell forms or plates or massive bodies for bodies of artificial material with glass, textile or asbestos fibres.

However, these known bodies have the disadvantage that when using mats of staple fibres with felt-like fibre binding as well as fabrics with any other binding, for example, linen binding or damask binding, the modulus of elasticity as well as the tensile strength of the resulting parts are relatively small and in any case so small that the advantages of the artificial materials reinforced with fibres over light metals or light wood are not particularly outstanding. This means that the extremely favourable tensile properties, especially of glass fibres with very small diameters (3 to 12μ), are not made use of fully. Since, in addition, the time required for processing such bodies and especially for shaping them is much longer than is the case with the pressing or drawing of metallic material, the bodies of artificial material reinforced with fibres have not been able to replace the light metals despite their other advantages.

It is, therefore, the main object of the invention to provide bodies of the general character described in which the extremely favourable tensile properties, especially those of glass fibres of very small diameter, can be fully made use of.

Another object of the invention is to provide bodies of the aforesaid kind in which at least one supporting shell form or plate is made of cords of fibres embedded in artificial material and arranged side by side and connected with one another, said cords being oriented substantially in the direction of the main tensile and compression stresses.

According to the invention use is made of cords of fibres oriented in the main stress direction and embedded in an unwoven state in a resin for the manufacture of bodies consisting of shell forms. As a result, the relation between the lateral strength (across the fibre) and shear strength in the direction of the fibre (fibre against fibre) and the tensile strength is substantially the same as with good qualities of wood. In comparison to bodies and shell forms of wood, the invention has, however, the advantage that the tensile strength is much higher and that shell forms of any shape can be made. When there exist several main stress directions, the supporting shell forms or plates can be composed, as with plywood, of several superposed sheets, the fibres in each sheet being oriented according to one of the directions of stress.

It is a further object of the invention to make, in order to increase also the shear strength in the direction of the fibres and the lateral strength across the fibres of the supporting shell forms or plates of the bodies, to make provision for covering at least one surface of the supporting shell form or plate with a sheet comprising a fibre fabric.

Yet another object of the invention is to provide bodies which can be provided with connecting eyes for transmitting the forces applied to the bodies and consisting of loop-like bent cords of fibres of the supporting shell form or plate. The loops can be bent outwards like flanges from the face of the shell form or plate.

A still further object of the invention is to provide a body in which, in order to support the supporting shell form or plate, the hollowed-out space of the body constituted by this shell form or plate can be filled with a foamed rubber-like artificial material.

According to the invention, fibre cords are applied on profile faces side by said, these cords consisting of fibres, preferably glass fibres, embedded in a still plastic polymerizable artificial resin, and thereafter the artificial resin is polymerized so that the fibre cords are connected during polymerization to constitute a shell form or plate or massive body. Preferably, cords with a circular cross-section can be squeezed or flattened on the profile face by means of suitable tools to a substantially rectangular cross-section of such a width that at each point of the shell form or plate the required wall thickness is obtained. In order to be able to observe more easily exactly the prescribed wall thickness, the width of the cords having the prescribed wall thickness can be marked before application of the cords by lines on the profile face along these lines and squeezed and flattened until each of its side edges registers with the proper marking line.

With these and other objects in view which will appear as the description proceeds the invention consists of certain novel features of construction as will be particularly pointed out in the appended claims.

The manner of carrying the invention into effect is hereinafter described by way of example, reference being had to the accompanying drawings in which.

Figure 1:
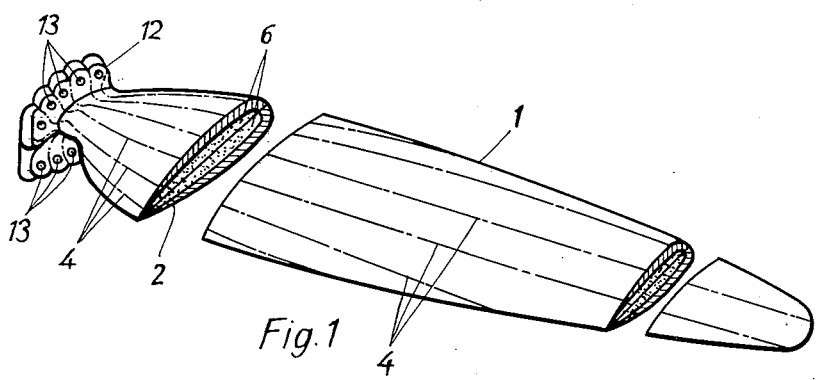
FIG. 1 is a perspective view of an air blade according to the invention, partly in section.
Figure 6:
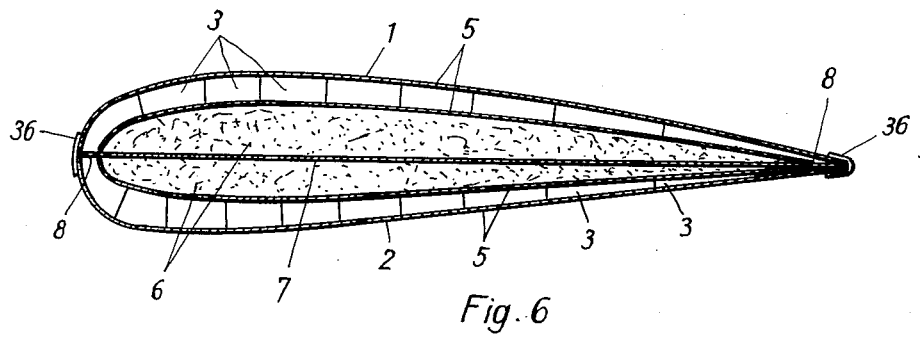
FIG. 6 is a cross-sectional view of the blade of FIG. 1 on an enlarged scale.

In FIGS. 1 and 6 there is represented an air blade made according to the invention. This blade consists of two shell forms 1 and 2, each of which consists of cords or strips 3 arranged side by side, said cords 3 being connected with one another and squeezed and flattened corresponding to the wall thickness of the shell forms and consisting of fibres embedded in artificial material, the fibres extending longitudinally to the cord limiting lines 4 being oriented substantially according to the main-load directions of the blade with respect to tension and compression. Both surfaces of each shell form are connected with a sheet 5 comprising a fibrous fabric. Thus the shearing strength in the direction of the fibres and the lateral strength in a direction across the fibres are increased.

Figure 8:
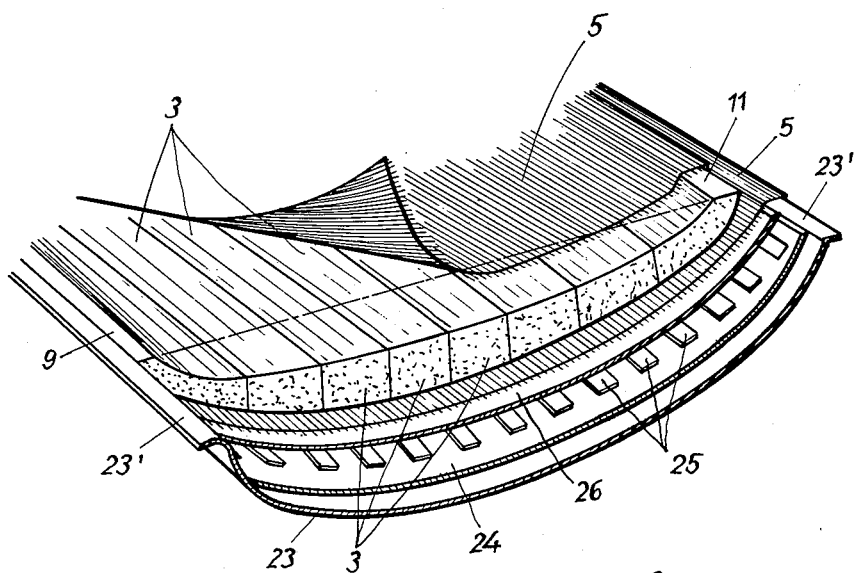
FIG. 8 is a diagrammatic view showing the structure of the profile face according to FIG. 2 and the air blade according to FIG. 1.
Figure 9:
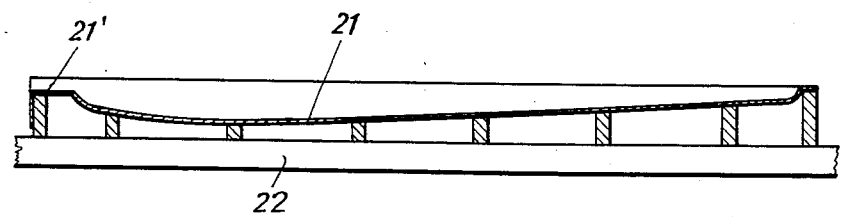
FIG. 9 is a longitudinal sectional view of the profile face according to FIG. 2.

The hollowed-out space of each shell form 1 and 2 is filled up with a preferably hard foamed plastic or rubber-like artificial material 6 so that each shell form constitutes a filled part of the air blade. The halves of the shell constituted by the two shell forms 1 and 2 are glued together by means of an intermediate sheet 7, 8. In the area of the foamed rubber-like artificial material 6 the intermediate sheet 7 consists of a plate of elastic foamed rubber-like artificial material. This plate of foamed artificial material is soaked with glue material, preferably an artificial resin, for example, polyester or epoxide resin. In the area of the edges 9 and 11 of the shell forms (FIG. 8), the intermediate sheet 8 consists of flattened cords or fibres embedded in a polymerisable still plastic artificial resin.

Figure 5:
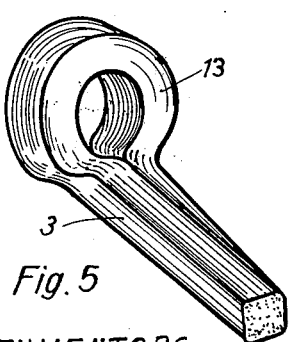
FIG. 5 is a perspective view on an enlarged scale of a connecting eye manufactured according to the invention.

The blade composed by the shell forms 1 and 2 presents on its base connecting eyes 13 constituting a flange 12, said eyes consisting of loop-like fibre cords of the shell forms bent into circular form 1 or 2, as it is shown in FIG. 5 with reference to a sole connecting eye 13 so as to have their axes substantially parallel to the longitudinal axes of the strips.

Figure 7:
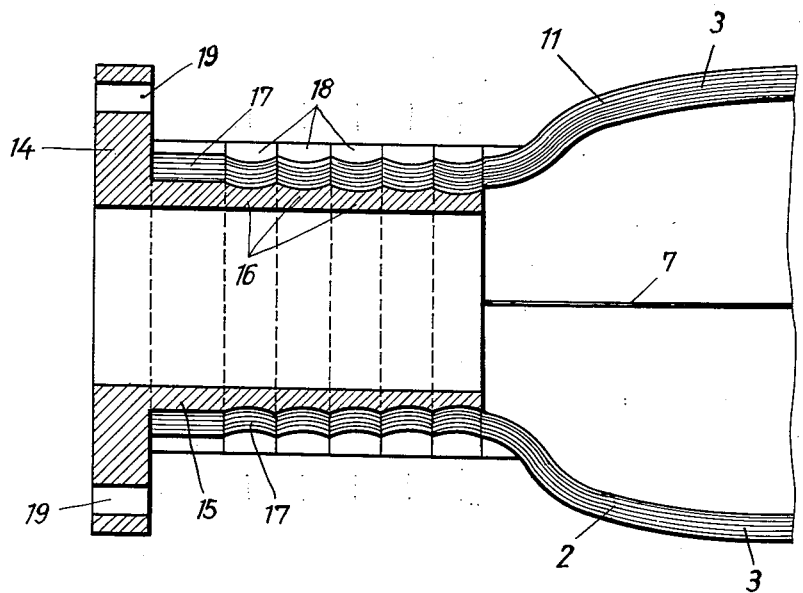
FIG. 7 is a longitudinal cross-sectional view of the connecting part of a modified embodiment of an air blade according to the invention.

In FIG. 7 there is represented a modified embodiment of the base of a blade composed by shell forms 1' and 2'. In this example there is shown a sleeve 15 provided with a flange 14, said sleeve being provided with grooves 16 on its outer walls. The ends 17 of the shell forms 1' and 2' to be connected with a sleeve are so designed that at least their inner faces have projections fitting into the grooves 16. On forming the blade by assembling the two shell forms 1' and 2', the sleeve 15 is embraced by the ends 17 of the two shells and forms a securing means.

Since the inner projections of the ends 17 of the shell forms engage into the grooves 16, the sleeve 15 is held in the blade. In order to prevent the sleeve 15 from being disconnected from the blade, the ends 17 are bandaged or wrapped with cords or strips 18 consisting of fibres embedded in a polymerizable artificial resin so that the loosening of the sleeve 15 is practically impossible. The flange 14 of the sleeve 15 is provided with holes 19 serving as connecting eyes.

Figure 2:
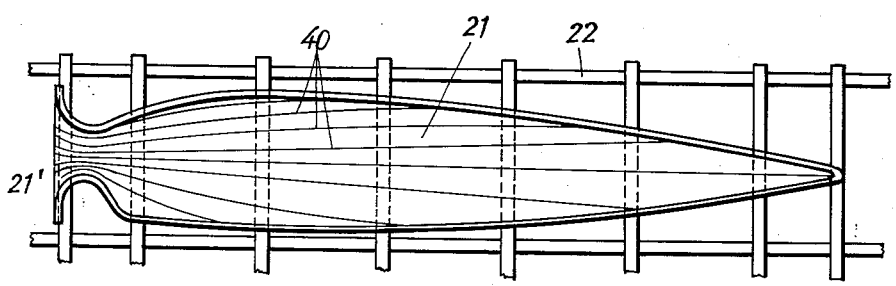
FIG. 2 is a plan view of a profile face used in the manufacture of blades according to FIGURE 1.

The method for manufacturing the blade represented in FIG. 1 is described below. For manufacturing the individual shell forms the profile or mold form face 21 represented in FIG. 2 is necessary. The profile face 21 is arranged on a rigid frame 22 of tubes or the like on which there are arranged profile discs not shown in the drawing. A support 23 (FIG. 8) rests on these profile discs, on which support a sheet 24 of artificial stones or wood cement is applied. On this sheet 24 of artificial stone or wood cement there are applied electrical resistances 25 of said or strip like form which are interconnected alternately so that when electric current flows therethrough the whole profile face is uniformly heated. On these resistances there is applied a thin sheet 26 of artificial stone or wood cement dressed smoothly, truly and correctly as to form. The real profile face constituted by the sheet 26 is given to the desired quality and especially smoothness of surface by grinding and spattling. For spattling there is to be preferred a clear and if possible white spatula. Beneath the adove said profile shell forms which carry the profile form consisting of the support 23 and the sheets 24 and 26, there are provided intermediate sheets, not shown in the drawings, into which a cooling means, for example artificial ice, is introduced.

Figure 4:
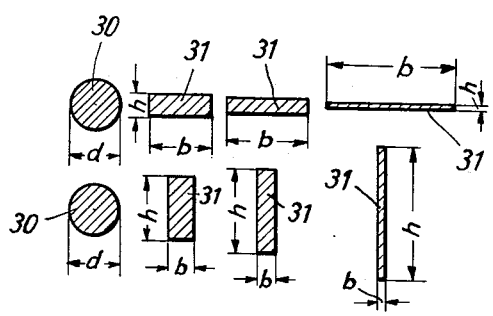
FIG. 4 shows cross-sections of cords of fibres produced during the manufacture of the shell forms according to the invention from a cord of circular cross-section.

As starting material for the manufacture of the shell forms 1 and 2, cords or strips 3 are used which consist of glass, artificial or natural fibres embedded in polymerizable still plastic artificial resin, for example, unsaturated polyester or epoxide or ethoxyline resin and which have preferably a circular cross-section 30 (FIG. 4). These cords 3 are located side by side on the profile face 21. In positioning the cords on the profile face 21, these are constricted with the aid of suitable tools to a substantially rectangular cross section 31 of such a width $b$ that at each point of the shell form the necessary wall thickness $h$ is attained. The width $b$ of the cord necessary for a determined wall thickness $h$ can be calculated easily with the aid of the following formula when the diameter $d$ of the circular cross section 3 of the cord is known:

$$b = \frac{d^2 \cdot \frac{\pi}{4}}{h}$$

Figure 3:
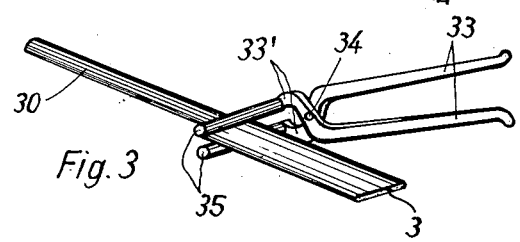
FIG. 3 is a perspective view of a tool for flattening cords of fibres and shown during use.

The flattening or compressing of the cross section 30 of the cord to one of the cross sections 31 represented in FIG. 4 can be performed by means of a spatula known per se. However, for this purpose there can be used also the nippers 32 represented in FIG. 3. The nippers 32 consist of two levers 33 which are interconnected pivotably about an axis 34. The levers 33' remote from the handles of the nippers present on their ends bolts 35 directed substantially parallely to the pivotal axis 34 of the nippers and constituting the jaws thereof. Preferably, these bolts 35 have a circular cross section. However, the cross section can have also any other form. When there are to be manufactured cords the surfaces of which are not exactly parallel, the bolts 35 can also have, naturally, such an inclination with respect to the pivotal axis 35 as to form, when the cord is flattened and compressed, an angle so that the opposite faces of the cords are inclined with respect to one another. The finished cords have the same cross-sectional area as the original cord but a different cross-sectional shape.

In order that the width $b$ of the cords necessary at different points of the profile face need not be measured every time, on the profile face 21 there are provided distinctly visible lines 40 which indicate the necessary width of the cross section 31 of the cords at each point of the profile face. These lines at least partially deviate slightly from parallelism, and each cord or strip is laid in the space between two adjacent lines.

In order to give to the shell form an increased lateral strength across the fibre and an increased shear strength in the direction of the fibres (fibre against fibre), on the profile face 21 there is located before application of the cords 3 a fabric of glass fibres constituting a sheet 5 and embedded in the artificial resin which is still plastic. The profile face 21 is provided before the insertion of the fabric and cords with one or more separating means, for example, foils or films, coatings, pastes or the like. The fabric sheet 5 is so transparent when soaked with the artificial resin that the marking lines 40 can be seen through the sheet 5.

On this sheet 5 there are now applied the cords 3 starting from a middle strip of the profile face individually to both sides and squeezed for example with the above described nippers 32 or with a spatula until the side edges of the cords coincide with the marking lines 40. On the shell form surface thus constituted by the cords 3 arranged side by side there is applied another fibre fabric embedded in plastic and polymerizable artificial resin and constituting a second sheet 5. This second sheet, too, serves to increase the lateral strength across the fibres and the tensile strength of the shell form.

During the application of the fibre fabric sheets 5 constituting the shell form and of the cords 3, the profile face 21 is conveniently cooled, for example, with artificial ice which for this purpose can be introduced into the above described intermediate sheets of the frame 22 carrying the form in order to prevent too early a polymerization of the artificial resin. When the shell form has been assembled in the above described manner, through the resistances 25 there is passed an electric current so that the profile face 21 is heated and the polymerization of the artificial resin is thus initiated and maintained until the individual parts of the shell forms harden and interconnect completely.

In the embodiment represented the profile face 21 is vaulted concavely. In the manufacture of an air blade such a concave form is to be preferred, since the outer face of the blade thereby receives a better quality of surface. The shell forms 1 and 2 can be made, however, also of convexly vaulted profile faces.

In order to be able to affix the blade 1, 2 to a hub, the ends of the cords are bent in the embodiment of the blade represented in FIG. 1 loop-like around a cylindrically shaped body so that there is produced the loop represented in FIG. 5. After the hardening of the artificial material, this loop constitutes a connecting eye 13. On the end 21' of the profile face 21 provided for the base of the blade 1, 2 the face 21 is so formed that the connecting eyes 13 constituted by the cords 30 lying side by side form a flange 12.

In order to be able to connect the shell forms 1 and 2 with the blade it is important that the edges 9 and 11 of the two shell forms be designed so as to lie one upon the other along the entire blade. It has proved thereby to be convenient to so design edges 9 and 11 that these lie in a common plane constituted by straight lines extending perpendicularly to the longitudinal axis of the blade. However, this plane must not be an even one. This can be easily accomplished by designing the edges 23' of the support 23 so that the edges 9 of the shell form 1 or 2 can be formed by a ruler resting upon the edges 23' and directed perpendicularly to the longitudinal axis of the blade.

After finishing the shell forms 1 and 2, the hollowed-out space of the shell form is filled with the foamed rubber-like artificial material moistened with the polymerizable still plastic resin. After the filling up of the shell form, the foamed rubber-like artificial material is wiped off by means of a ruler extending longitudinally to the planes of the marginal face 9, 11 so that the shell form constitutes after the polymerization of the foamed rubber-like artificial material a full and solid body limited by the marginal faces 9, 11.

Two body parts constituted in this manner by the shell forms 1 and 2 are now glued together along their marginal faces 9, 11. For this gluing together there is used in the vicinity of the filling 6 of foamed artificial material a plate 7 of elastical foamed artificial material soaked with the polymerizable artificial material and in the vicinity of the real shell form margins 11 and 9 a correspondingly flattened and squeezed cord 8 of glass fibres embedded in the polymerizable artificial resin. After the polymerization of the sheets 7 and 8 the two bodies constituted by the shell forms 1 and 2 and the fillings 6 are positively connected with one another.

In order to increase still further the sticking together of the two body parts, the narrowest part of the blade close to the flange 12 can be bandaged or wrapped with cords or strips of glass fibres and artificial material which cords are positively connected after polymerization with the blade surface so as to be no longer removable. There can also be glued to the shell form surface on the joints between the two shell forms 1 and 2 reinforcing strips 36 covering the neighbouring parts of the shell form surface.

For making the modified embodiment of a blade represented in FIG. 7, the end 21' of the profile face 21 is modified in a manner not represented in the drawing so as to constitute a cylindrical face which presents on its inner face projections corresponding to the grooves 16. The cords applied to the cylindrical face designed in this manner receive in this case undulated shapes as represented in FIG. 7 so that there result on the inner face of the shell forms 1' or 2' projections fitting into the grooves 16 of the sleeve 15. When the two shell forms 1' and 2' are applied to one another as above described, the sleeve 15 is clamped between the ends 17 of the shell forms, and there is preferably used for a better connection of the sleeve 15 with the shell forms an adhesive, for example, a polymerizable artificial resin. Thereafter, a bandage of cords 18 of artificial material fibres is wound around the parts 17 of the shells which is positively connected after polymerization with the shell form surface.

Above there has been described as example of a body made according to the invention an air blade. In the same manner any other body can be manufactured. The method is suitable for making massive bodies, for example, the above described air blade or for making hollow bodies, for example, body-works for automobiles, aircraft, aircraft blades and the like. There can also be manufactured with the method according to the invention even plates and parts serving to take up great amounts of work or energy. From the above it can also be seen that the shell forms or plates can be assembled from several superposed sheets constituted of cords of artificial material and glass fibres, whereby the fibres in the different sheets can be orientated differently so that a shell or plate is produced which has a great strength with respect to several main tensile and compression directions. Because of their great tensile strength, glass fibres are to be preferred. The method according to the invention can be performed, however, also with cords of artificial material fibres or natural fibres.

The cords which consist of fibres embedded in artificial material mentioned above mean substantially long products in which the fibres embedded in the artificial material extend longitudinally to the cord or product. It is important that the supporting shell forms be constituted by several cords arranged side by side. Thus, there can be used, for example, as fibrous bodies embedded in artificial material mat-like fibrous products not interwoven in which the unconnected fibres are arranged substantially parallelly to one another to form bundles and have a relatively great length. The use of cords with relatively small diameter has the advantage that such cords can be made with the fibres having an approximately constant proportion throughout the volume of the cord so that by the use of such cords with relatively small diameter it is ensured that the proportion of the fibre in the entire volume of the wall of the shell form is substantially equal at all points of the shell form.

In the embodiment represented there is described a body filled with foamed rubber-like artificial material. The method according to the invention can, however, be used also for making full or hollow bodies in which the walls of this latter body can be constituted by shell forms with one or more sheets made out from the cords and corresponding to the shell forms 1 and 2 or with walls which can be constituted, in order to increase their strength, of several sheets corresponding to the shell forms 1 and 2 between which sheets there are arranged sheets of foamed rubber-like artificial material serving as filling material.

The foregoing description is directed solely towards the methods illustrated, but we desire it to be understood that we reserve the privilege of resorting to all mechanical changes to which the method is susceptible, the invention being defined and limited only by the terms of the appended claims.

Having thus described the invention, what we claim as new and desire to secure by Letters Patent is:

1. Process for the production of fibre-reinforced shells or plates of plastic material, which comprises impregnating a plurality of separate bundles of unconnected fibres with a plastic polymerizable binder which is plastic at room temperature, forming said impregnated bundles separately into strips of constant cross-sectional area but varying cross-sectional shape, laying thereafter said impregnated bundles in contacting side-by-side relation on a mold form surface with the fibres extending in the direction of the principal stress, and thereafter polymerizing the binder.

2. A process as claimed in claim 1 in which the mold form surface has a plurality of lines at least partially slightly deviating from parallelism inscribed thereon, and the width of each strip is made to correspond at each point along its length to the space between two adjacent lines over which the strip is laid.

3. In a process as claimed in claim 1, the step of bending the ends of the strips at one end out of the longitudinal planes of the strip and into circular form to constitute open eyes, the adjacent eye-forming parts contacting each other to provide a series of holes whose axes lie in planes substantially parallel to the longitudinal axes of the strips.

4. In a process as claimed in claim 1, the step of laying the center strip first and thereafter laying succeeding strips on both sides of the center strip.

5. A process as claimed in claim 1 in which a fibre fabric impregnated with soft polymerizable plastic is laid on the mold form surface and the strips are laid on such fabric and bonded thereto by polymerization.

6. A process as claimed in claim 5 in which a fibre fabric impregnated with a soft polymerizable plastic is laid on the sides of the strips remote from the mold form surface and bonded thereto by polymerization.

7. A process as claimed in claim 1 in which a fibre fabric impregnated with a soft polymerizable plastic is laid on the sides of the strips remote from the mold form surface and bonded thereto by polymerization.

8. A process as claimed in claim 1 in which the mold is cooled during the laying of the fibres thereon and is thereafter heated to accelerate polymerization.

9. A process for producing a hollow structure of fibre reinforced plastic material, which comprises forming two shell halves each by impregnating a plurality of separate bundles of unconnected fibres with a plastic polymerizable binder which is plastic at room temperature, forming said impregnated bundles separately into strips of constant cross-sectional area but varying cross-sectional shape, thereafter laying said impregnated bundles in contacting side-by-side relation on a concave mold form surface with the fibres extending in the direction of the principal stress, and thereafter polymerizing the binder, said shell halves having flat mating edges, placing the shell halves together with their concave faces towards each other, laying between said mating edges a fibre-reinforced polymerizable plastic, and polymerizing the same.

10. In a process as claimed in claim 9 in which the flat mating edges of each shell half are coplanar, filling the interior of each shell half before they are polymerized with a polymerizable foam plastic and removing all such foam plastic above the planes of the shell half edges.

11. In a process as claimed in claim 9, in which said shell is provided with securing means at one end, wrapping binding strips of fibre-reinforced plastic material around the assembled shell halves adjacent such end and polymerizing said binding strips to bond them to the shell halves.

References Cited in the file of this patent

UNITED STATES PATENTS

| | | |
|---|---|---|
| 2,029,214 | Atwood | Jan. 28, 1936 |
| 2,155,375 | Jablonsky | Apr. 18, 1939 |
| 2,175,204 | Lougheed | Oct. 10, 1939 |
| 2,182,812 | Lougheed | Dec. 12, 1939 |
| 2,340,133 | Martin | Jan. 25, 1944 |
| 2,400,649 | Larsen | May 21, 1946 |
| 2,428,970 | Hardy | Oct. 14, 1947 |
| 2,445,624 | McDermott | July 20, 1948 |
| 2,482,798 | Rheinfrank | Sept. 27, 1949 |
| 2,541,661 | Palmatier et al. | Feb. 13, 1951 |
| 2,589,786 | Engel et al. | Mar. 18, 1952 |
| 2,593,714 | Robinson | Apr. 22, 1952 |
| 2,655,459 | Gordon | Oct. 13, 1953 |
| 2,715,598 | Rees | Aug. 16, 1955 |

FOREIGN PATENTS

| | | |
|---|---|---|
| 345,148 | Germany | Dec. 6, 1921 |
| 502,409 | Great Britain | Mar. 13, 1939 |

OTHER REFERENCES

"Low-Pressure Laminates for Aircraft," British Plastics, December 1951, vol. 24, pages 415–420, page 417 particularly relied on.